(12) United States Patent
Khodko et al.

(10) Patent No.: US 7,251,695 B2
(45) Date of Patent: Jul. 31, 2007

(54) COMPUTER NETWORK COMMUNICATION METHOD AND APPARATUS

(75) Inventors: Oleg M. Khodko, Woburn, MA (US); Michael Roy Gobler, Newton, MA (US)

(73) Assignee: Aspen Technology, Inc., Cambridge, MA (US)

( * ) Notice: Subject to any disclaimer, the term of this patent is extended or adjusted under 35 U.S.C. 154(b) by 843 days.

(21) Appl. No.: 09/928,667

(22) Filed: Aug. 13, 2001

(65) Prior Publication Data
US 2002/0035597 A1    Mar. 21, 2002

Related U.S. Application Data

(60) Provisional application No. 60/225,967, filed on Aug. 17, 2000, provisional application No. 60/232,282, filed on Sep. 13, 2000.

(51) Int. Cl.
*G06F 15/16* (2006.01)

(52) U.S. Cl. .................. 709/227; 709/228

(58) Field of Classification Search ........ 709/227–228, 709/237
See application file for complete search history.

(56) References Cited

U.S. PATENT DOCUMENTS

| | | | | | |
|---|---|---|---|---|---|
| 3,891,974 | A | * | 6/1975 | Coulter et al. ............ | 703/23 |
| 4,486,853 | A | * | 12/1984 | Parsons .................... | 345/418 |
| 5,943,478 | A | | 8/1999 | Aggarwall et al. ........ | 395/187.01 |
| 6,317,791 | B1 | * | 11/2001 | Cohn et al. ............... | 709/227 |
| 6,370,656 | B1 | * | 4/2002 | Olarig et al. .............. | 714/23 |
| 6,496,851 | B1 | * | 12/2002 | Morris et al. ............. | 709/204 |
| 6,564,261 | B1 | * | 5/2003 | Gudjonsson et al. ...... | 709/227 |
| 6,651,086 | B1 | * | 11/2003 | Manber et al. ............ | 709/205 |
| 6,714,982 | B1 | * | 3/2004 | McDonough et al. ..... | 709/228 |
| 6,721,286 | B1 | * | 4/2004 | Williams et al. .......... | 370/282 |
| 6,757,732 | B1 | * | 6/2004 | Sollee et al. .............. | 709/227 |
| 6,784,901 | B1 | * | 8/2004 | Harvey et al. ............ | 345/757 |
| 2003/0133417 | A1 | * | 7/2003 | Badt, Jr. .................. | 370/254 |
| 2004/0233293 | A1 | * | 11/2004 | Brumitt et al. ........... | 348/207.1 |
| 2005/0147224 | A1 | * | 7/2005 | Olafsson et al. .......... | 379/93.35 |

FOREIGN PATENT DOCUMENTS

EP    0838774 A2    4/1998

(Continued)

OTHER PUBLICATIONS

Kanitkar, V. and A. Delis, "Real-Time Client-Server Push Strategies : Specification and Evaluation," *Proceedings Real-Time Technology and Applications Symposium*, Jun. 3, 1998 (pp. 179-188).

(Continued)

*Primary Examiner*—John B. Walsh
(74) *Attorney, Agent, or Firm*—Hamilton, Brook, Smith & Reynolds PC

(57) ABSTRACT

The present invention provides a method and system for using standard global computer network communication protocol to implement server driven "push" technology. An initial communication connection is established between a server and a client. The connection is maintained by predefined periodic signals which are non-substantive messages from the server to the client. Upon existence of a substantive message at the server, the server transmits an appropriate predefined signal to the client. The client thereafter receives the substantive message. In one application, the server exchanges substantive messages between two clients and as such provides instant messaging.

23 Claims, 3 Drawing Sheets

FOREIGN PATENT DOCUMENTS

| | | |
|---|---|---|
| WO | WO99/26153 | 5/1999 |
| WO | WO 00/48100 | 8/2000 |
| WO | WO00/05903 | 2/2003 |

OTHER PUBLICATIONS

Harvey, D.A., "BackWeb Delivers All-in-One Content Solution," *Windows Sources*, Apr. 19, 1998 9:18 PM PT, http:// www.zdnet.com/filters/printerfriendly/0,6061,303738-3,00.html.

Gibbs, M., "Push and Pull for Suckers?," *Intranet*, p. 31 (Jul. 1997).

Streeter, A., "Push Technology Automates Web Surfing for Info Junkies; Includes Related Article on Charles River Analytics and Its Push Technology; Internet/Web/Online Service Information, " *MacWEEK*, 11 (13): 27 (Mar. 31, 1997).

Schwartz, S., "When Push Comes to Shove," *Insurance & Technology*, 36-42 (Jun. 1997).

Yoon, B.R., et al., "COPEN: A CORBA-Based Intelligent Push-engine," *Paper, Dept. of Computer Science, Songsil University*, Seoul, Korea.

"ADVANCED BusinessLink Goes Native (No Box in the Middle) With the Third Generation of Its Java Powered Client Technology," Document type: Newswire, Kirkland, WA, May 19, 1998.

"Push Technology Drives Information to Desktop," *Electronic Messaging News*, 9(2): ISSN- 1044-9892, Jan. 22, 1997.

"How IT Works; Push Technology Collects Information From Web Sites and Automatically Transmits It To Users Who Want It," *Client /Server Computing*, ISSN- 046-4468, Jun. 1997.

Covell, A., "The Push For Internet News Services; Discusses Market Demand For, Technological Developments in Internet "Push" Technology," *Network Computing*, p. 110, ISSN- 1046-4468, Apr. 1, 1997.

Nerney, C., "Net-It Makes New Document Management Push," *Network World*, p. 43, Oct. 27, 1997.

\* cited by examiner

COMPUTER NETWORK COMMUNICATION METHOD AND APPARATUS

RELATED APPLICATIONS

This application claims the benefits of U.S. Provisional Application Nos. 60/225,967 filed on Aug. 17, 2000 and 60/232,282 filed on Sep. 13, 2000, the entire teachings of which are incorporated herein by reference.

BACKGROUND OF THE INVENTION

The phrase 'push technology' refers to tools and techniques used by an Internet server to send information to a client without waiting for the client to make a specific request for that information. The information is thereby 'pushed' to the client as opposed to being 'pulled' by the client (i.e. in response to a client request for the information.) By comparison to pull, push technology has the potential to give vendors and enterprises greater control of what a client sees because the server rather than the client is the final arbiter of information displayed. There is a lot of interest in push technology in the Internet community. Dozens of companies have released products purporting to use push technology. Many papers have been written on the subject.

Push technology differs from the familiar "pull" technology commonly used on The World Wide Web. With 'pull', a client browser must request a Web page before it is sent. Broadcast media, for example, uses push technology because it sends information out regardless of whether anyone (client side) is tuned in. Probably the oldest and most widely used push technology is e-mail. This is a push technology because the user receives mail whether or not the user wants the mail. That is, the sender pushes the message to the receiver rather than the receiver requesting the message from the sender. Push Technology is a relatively recent development and is therefore an immature technology. Standards are still emerging. Among others, Microsoft has proposed an Internet broadcast standard called CDF (Channel Definition Format) and Netscape has included a "push" component in Netscape Communicator called Netcaster which enables push delivery of information to browsers. Push Technology can be used in both internet and intranet situations.

Some systems which are described by vendors as "push" technology actually are "pull" systems which periodically request information from a server. Those systems consume a lot of bandwidth because they are client-side applications which download information on a periodic (e.g. hourly) basis. The download method can considerably slow internet traffic to a server because dozens of users in a company may have individual applications running.

True "Push" programs currently require communication to occur outside of standard HTTP protocol. The commonly used schema has been to establish a proprietary communication channel using the TCP/IP protocol. However, this requires assignment of a custom port which many organizations will prohibit for security reasons. Even in organizations that are willing to open a non-HTTP port, the different fire walls and proxies in use today make safe and reliable implementations of a custom TCP/IP notification mechanism that will not compromise the security of the firewall difficult to implement. Therefore, the custom TCP/IP port approach is not likely to become a widely accepted push mechanism for notification across the Internet of the availability of data which a server seeks to send to clients.

SUMMARY OF THE INVENTION

The present invention provides a method and system for using standard communication protocol for implementing a server driven "push" technology. It thereby avoids firewall and other security issues induced by non-standard communication. Once a client establishes a connection to a server, the server is responsible for maintaining or keeping the connection alive which it does by periodically sending a "No Message" flag. In the preferred embodiment, the no message flag is a predefined single character signal. The client effectively ignores the "No Message" signals that it receives. When the server needs to send information to the client (i.e., there exists substantive information/message content at the server), the server sends a "Message Pending" flag along the already established and currently maintained connection.

The server may then either send the substantive message or the client may use receipt of the "Message Pending" flag to trigger a separate request to the server for receipt of the pending message. This client initiated request may be, for example, a client-ready message that indicates that the client is prepared to accept the substantive message.

In one embodiment of the invention, all communication occurs using standard HTTP protocol over the Internet. In various embodiments, client side communication is implemented using HTML, JAVA, or ActiveX.

In accordance with one aspect of the present invention, the initial request to establish connection includes an identifier that uniquely represents the current client application.

In accordance with another aspect of the present invention, the invention is utilized in an on-line trading application (or other application running at the server). In that case, the server sends as substantive messages to clients new offers (to buy or sell) and/or updates to offers posted by the trading application. Also the server sends (exchanges) between two certain end users/clients counter offers and replies to the same, and hence effectively provides instant messaging.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

The present invention generally relates to the field of networking and client server communication. More specifically, the present invention relates to methods and systems for providing content to a client computer.

Figure 2:
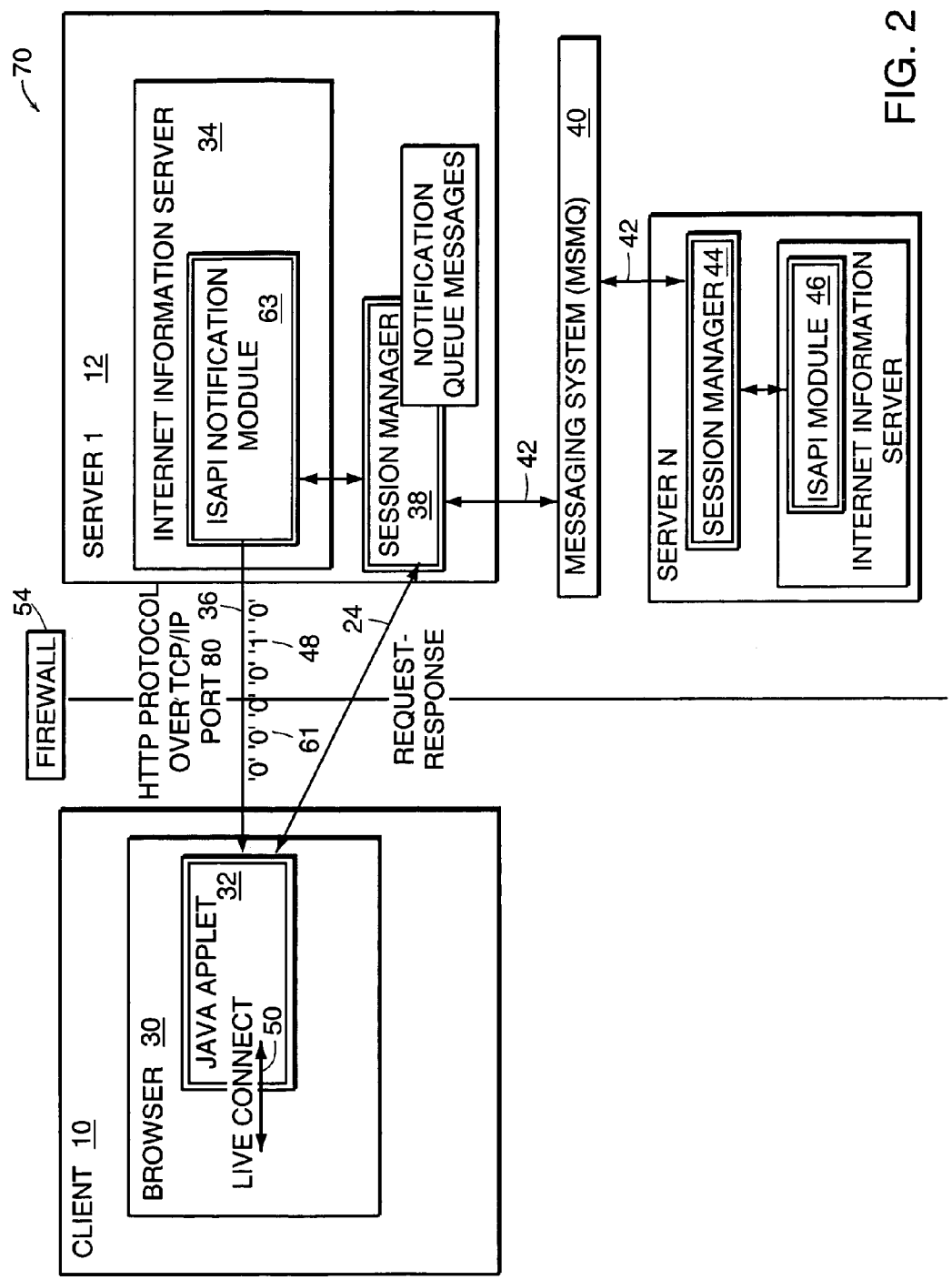
FIG. 2 is a block diagram of module interaction in a preferred embodiment of the present invention.

With reference to FIG. 2, the present invention provides a safe solution to the above mentioned "push" data notifi cation security concerns. That solution makes innovative use of standard HTTP protocol. By limiting itself to standard HTTP protocol that uses the accepted port (so-called port 80) for Internet communication 36, the present invention avoids creating an opportunity for hackers and viruses to breach firewall 54 security. Extending the HTTP protocol for implementation of "push" technology over the Internet is hereafter referred to as "XTTP".

Figure 1:
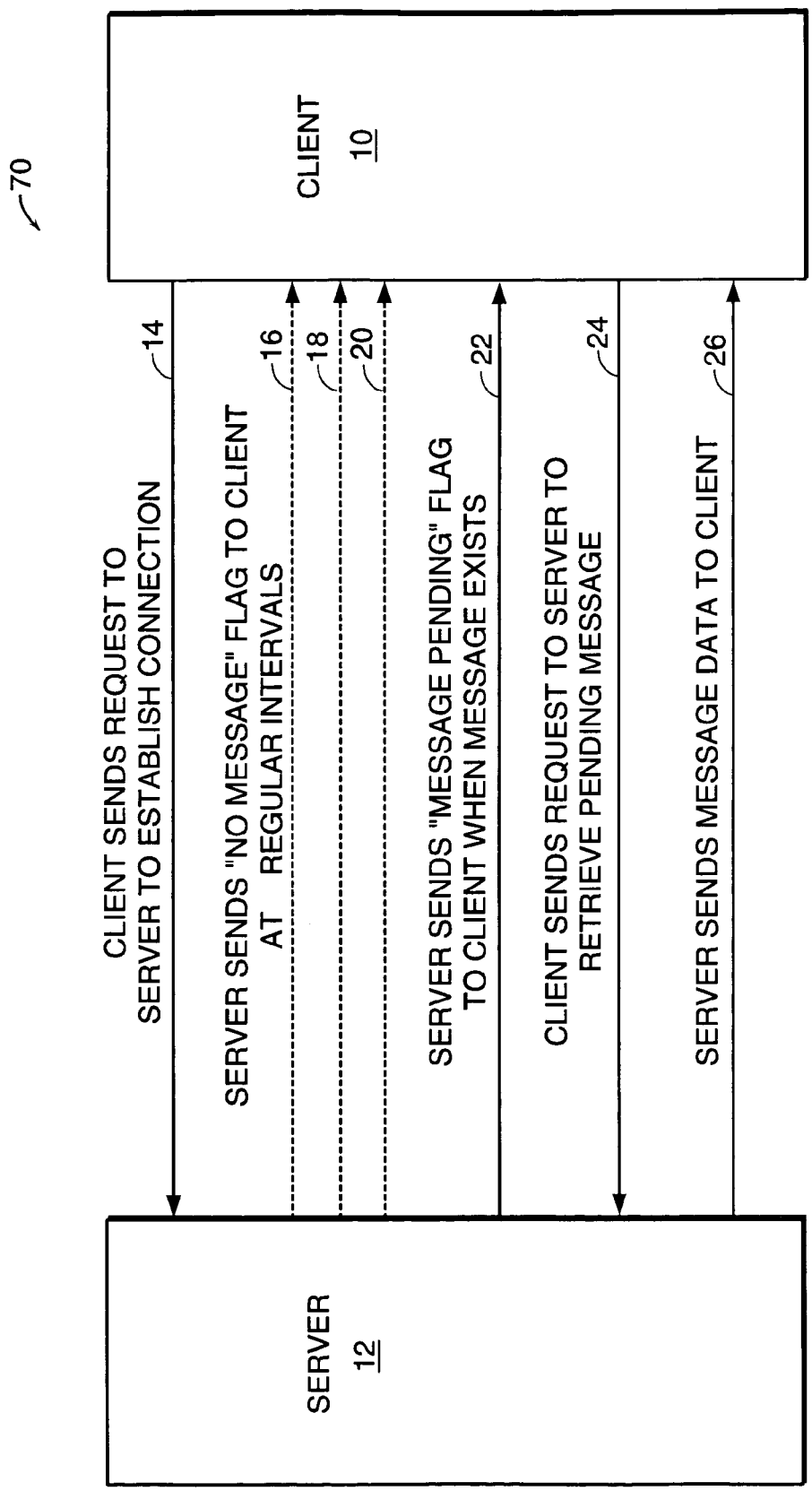
FIG. 1 is a schematic view of information flow in an implementation of the present invention.

An example implementation 70 is illustrated in FIG. 1 and works as follows:

A Client computer 10 establishes a connection to a Server computer 12 using a request 14 conforming to standard HTTP protocol. The Server computer 12 is responsible for keeping the connection alive, which it does by sending a predefined "No Message" flag 16, 18, 20 (such as a single character, '0') periodically at a predefined interval (such as every 2 minutes.) The Client computer 10 effectively ignores (i.e., takes no further action in response to) the "No Message" signals 16, 18, 20 that it receives. When the Server 12 needs to send information to the Client 10, the Server 12 sends a predefined "Message Pending" flag 22 (such as a single character '1') along the already-established and maintained connection. The Server 12 may send the subject information across this connection or the Client 10 may use receipt of the "Message Pending" flag 22 to trigger a separate request 24 to the Server 12 to transmit the subject information/pending message 26. Among implementation technologies, the Client side may be implemented as an HTML page in a browser, a Java-based applet, or an ActiveX control, for example.

Using the HTTP protocol for implementing "push" technology has the following advantages.

Transparency

Availability of security protocols

Ability to cross firewalls

Open Standard

Ease of implementation and use

A description of one preferred embodiment of XTTP based on Microsoft Distributed Internet Architecture (DNA) follows and is illustrated in FIG. 2.

1. On the Client computer 10, the user points an Internet browser 30 to an HTML page. The page contains a Java applet 32, which is then downloaded to the Client computer 10. Since the Java applet 32 complies with security requirements, the Browser 30 does not ask the user to accept that applet 32. Instead, the applet 32 starts automatically and transparently.

2. Once the Java applet 32 is started, it establishes an HTTP connection 36 to an Internet Server API (ISAPI) module 63 of the Internet Information Server (IIS) 34 on server computer 12. The applet 32 provides an identifier that uniquely represents the current user or current application of client computer 10.

3. The ISAPI module 63 establishes the HTTP connection 36 with "Keep-Alive" status. In order to keep (maintain) the connection 36, the ISAPI module 63 sends the single character '0' (the numeral zero) "no message" signal every two minutes. Other signal frequencies are suitable. The Java applet 32 receives and effectively ignores this "no message" flag 61.

4. The ISAPI module 63 also registers this XTTP session with the XTTP Session Manager 38, using the unique identifier supplied by the Java applet 32 in step 2. The XTTP Session Manager 38 may be implemented as a Service running on the server computer 12.

5. When an application running on the server 12 has information it wants to push to a client 10, it sends a message 42, via Microsoft Message Queues (MSMQ) 40, to all XTTP Session Managers 38, 44 of server 1 through server n. The server message 42 asks the session managers 38, 44 to notify all respective clients with a given identifier. The message payload includes an XML representation of the information to be sent to the client. Every XTTP Session manager 38, 44 that has a registered client with the given identifier acts on that message 42 as follows.

6. The XTTP Session manager 38, 44 holds the payload, cataloguing it by the identifier of the intended recipient. The XTTP Session manager 38, 44 then calls a method on the ISAPI module 63, 46 which sends the single character '1' (the numeral one) "pending message" signal 48 along all connections 36 that have the specified identifier.

7. When the Java applet 32 on client 10 receives this "message pending" flag 48, it generates a new HTTP request to the Web Server 12, requesting a "data" connection 24 and passing the identifier of the current user. The ISAPI module 63 handles this request by asking the XTTP Session Manager 38 for the message payload associated with that identifier and returning that XML data as a response to the client's 10 request 24. The data is processed by DHTML components in the HTML page using Live Connect technology 50. Because all communication conforms to HTTP standards, the communications pass through a firewall 54 undergoing whatever security checks have been established.

The following scenario describes a potential use of the invention XTTP technology within Business Process Explorer (BPE), a product of Aspen Technology, Inc. of Cambridge, Mass., the assignee of the present invention.

Figure 3:
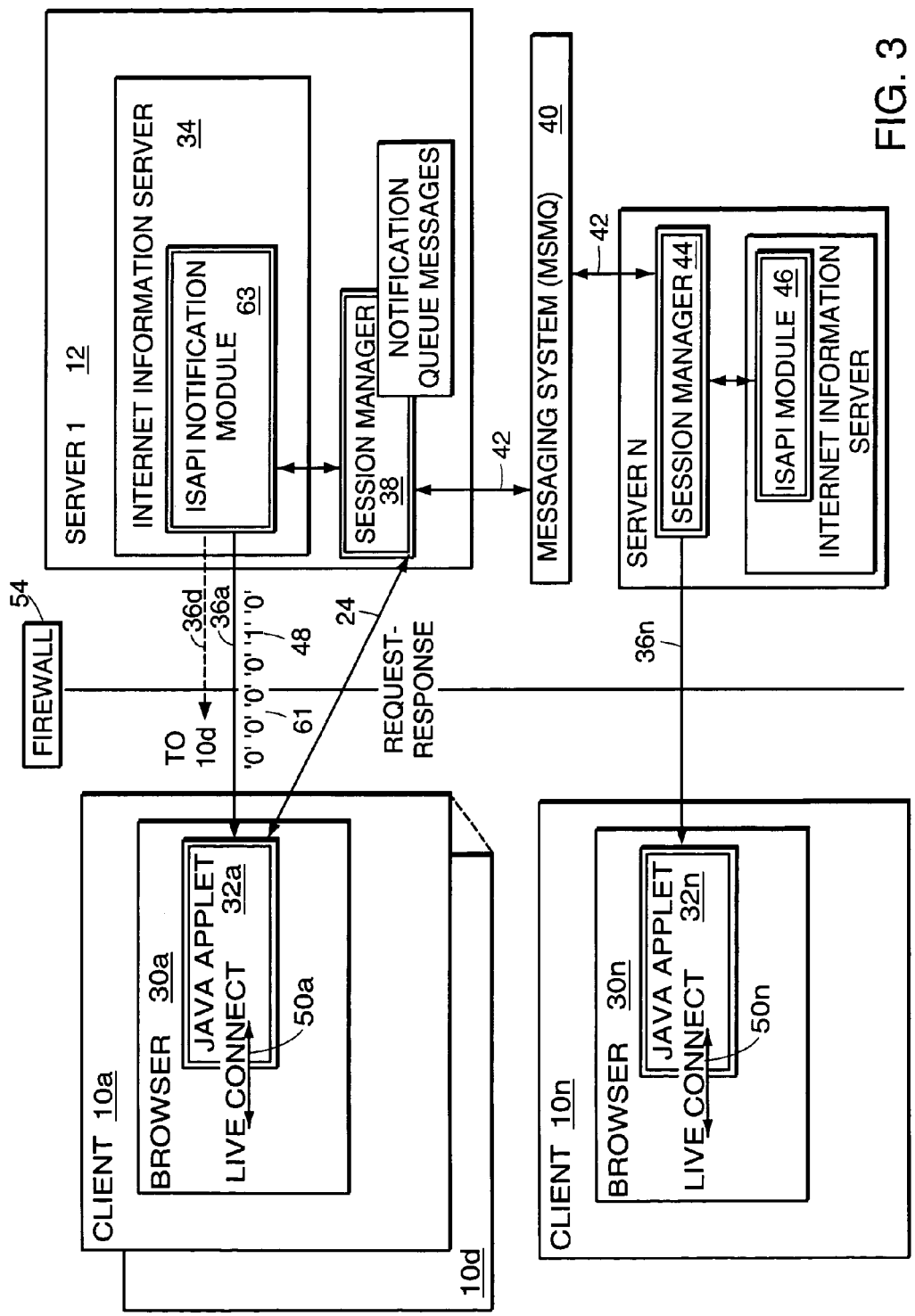
FIG. 3 is another block diagram of module interaction illustrating the present invention in certain applications.

Referring to FIG. 3, a user points an Internet browser 30a to the Web page for BPE (hosted at server 12). The user is prompted for a username and password. Once the user is authenticated, the web page initiates an XTTP connection 36a, providing the username of the current user to identify this session. Server 12 maintains connection 36a with "no message" flags/predefined signals as described in FIG. 2.

As usual, BPE then displays for the user the list of tasks that the user is expected to complete. The tasks are organized in a workflow diagram that shows the relationship between this user's tasks and other users' tasks. For example, suppose the current user is a Plant Operator. The first task for the Plant Operator is to update the operating plan for the plant for that day. The second task is to send the updated plan to the Plant Manager for approval. The third task is to adjust the plant's operating parameters to match the updated plan. Since the Plant Operator cannot begin the third task until receiving approval from the Plant Manager, the workflow diagram indicates the required involvement of the Plant Manager between the second and third tasks.

The Plant Operator performs the first two tasks. The Plant Manager then reviews and approves the plan using an appropriate application designed for that purpose. The Plant Manager applications may run on server 12 or a different server n, or distributed across multiple servers 1 through n. Upon approval, this application sends a message to the XTTP Session Manager 38, 44 (as described above) indicating the Plant Operator as the recipient. The client 10a is notified immediately, and the BPE (across data connection 24) updates the Web page to show a "Plan Approved" message in a message frame. The same approach can be used to notify the Plant Manager when the Plant Operator has updated the plan and is waiting for approval by the Plant Manager. The Plant Manager is, for instance, logged on through client 10n. Between client 10n and a respective server n, there is a respective connection 36n established and maintained as described above for connection 36a. Alternatively, the Plant Manager is logged on through one of multiple clients (e.g., client 10d) of server 12. A respective connection 36d is established and maintained as described above for connection 36a.

In a like manner, a process control application (another server application) running the example plant detects the pressure in a vessel exceeding the normal range. The application sends a message to the XTTP Session Managers 38, 44 as previously described, indicating the Plant Manager as the recipient. The client 10n (or 10d) of the Plant Manager is notified immediately, and the BPE updates the web page to show a large, flashing, red alarm.

In another scenario, the invention method and system is used within an on-line trading system such as TradersEdge, a product of PetroVantage, Inc.

A user (User 1) points an Internet browser 30a (FIG. 3) to the Web page for the active trading system (hosted on server 12 in this example). The user is prompted for a user name and password. Once the user is authenticated, the Web page initiates an XTTP connection 36a, providing the user name of the current user to identify this session. A second user (User 2) logs on to the on-line trading system (at server 12) the same way through a respective client 10d browser, and a respective XTTP connection 36d is established for the second user as well.

It is understood that second user User 2 may alternatively be logged on through client 10n and browser 30n with a respective XTTP connection 36n (established and maintained according to the principles of the invention) through server n.

One of the features of the on-line trading system allows a user to enter the details of an offer to buy or sell a certain quantity of a certain commodity. These offers are stored on the server 12 and displayed in a "Trade Summary" screen on every client 10. When a user enters the details of an offer and effects submission of (e.g., clicks on a button to submit) the offer, the server 12 stores the offer and then sends a message 42 to the XTTP Session Manager 38 indicating that all clients 10 should be notified of a change to the Trade Summary. All clients 10 are notified immediately, and those who have the Trade Summary screen open, request 24 the new Trade Summary data from the server 12. Similarly, all clients 10 are notified when changes are made to existing offers to buy or sell.

Another important feature of the on-line trading system allows users to negotiate through instant messaging type communications. For example, User 1 (at client 10a) sees in the Trade Summary an offer to buy a certain commodity, types a counteroffer to this prospective buyer, and selects/activates the Negotiate button/operation. The message is sent to the server 12 which identifies the prospective buyer as User 2 at client 10d for example (alternatively at client 10n), and sends a message 42 to the XTTP Session Manager 38, 44 indicating that the counteroffer should be routed to User 2. The client 10d (or 10n) for User 2 is notified immediately and opens a window to display the counteroffer to the user. User 2 may respond back to User 1 through the same mechanism. To that end, the server 12 exchanges substantive messages between two clients and hence the present invention effectively provides/enables instant messaging.

While this invention has been particularly shown and described with references to preferred embodiments thereof, it will be understood by those skilled in the art that various changes in form and details may be made therein without departing from the scope of the invention encompassed by the appended claims.

In particular but without limitation, although this invention has been described with reference to a software implementation, it is clear that it could equally well be implemented in hardware, firmware, or a combination. Likewise, where the foregoing description refers to HTTP protocol, other similar Internet communications protocols are suitable.

Further, where reference to the Internet is made, it is understood that the invention also applies to other global networks of computers.

In addition, it is understood that multiple clients 10a, b . . . n may be coupled to server 12 and server n respectively. Each client 10 has a respective browser 30a . . . n, Java applets 32a . . . n, Live Connect supported pages 50a . . . n and session connections 36a . . . n maintained in accordance with the present invention.

What is claimed is:

1. A computer network communications method comprising the steps of:
   transmitting from a client to a server a request to establish a connection;
   iteratively
   (a) maintaining the connection in the absence of a substantive message, wherein maintaining the connection includes transmitting a single character indicator pre-established to indicate a non-substantive message from the server to the client at short intervals; and
   (b) transmitting from the server to the client a substantive message upon existence of the substantive message at the server, the single character indicator being outside of and separate from a substantive message.

2. A method as claimed in claim 1 wherein the step of transmitting a substantive message further includes transmitting from the server to the client a predefined signal indicating existence at the server of the substantive message.

3. A method as claimed in claim 2 further comprising the step of receiving at the server a client ready message indicating that the client is prepared to accept the substantive message.

4. A method as claimed in claim 1 wherein transmissions between the client and the server occur using HTTP protocol.

5. A method as claimed in claim 1 wherein client side transmissions are implemented at least partly in HTML.

6. A method as claimed in claim 1 wherein client side transmissions are implemented at least partly in JAVA.

7. A method as claimed in claim 1 wherein client side transmissions are implemented at least partly as an ActiveX control.

8. A method as claimed in claim 1 wherein the request to establish the connection includes an identifier that uniquely represents a current client application.

9. A method as claimed in claim 1 wherein the step of transmitting a substantive message includes the server transmitting as substantive messages to at least one client new offers and/or updates to offers in a trading application.

10. A method as claimed in claim 9 wherein the step of transmitting a substantive message further includes the server transmitting between two clients counter offers and respective replies, such that instant messaging between the two clients is effectively provided.

11. A method as claimed in claim 1 wherein the step of transmitting a substantive message further includes the server exchanging substantive messages between two clients and thereby providing instant messaging.

12. A computer network communications system comprising:
   a request from a client computer to a server computer for establishing a connection; and
   the server, in response to the request, maintaining the connection by transmitting a single character indicator pre-established to indicate a non-substantive message from the server to the client at short intervals and, upon existence of a substantive message at the server, transmitting to the client the substantive message, the single character indicator being outside of and separate from a substantive message.

13. A system as claimed in claim 12 wherein upon existence of the substantive message at the server, the server further transmits to the client a predefined signal indicating existence at the server of the substantive message.

14. A system as claimed in claim 13 wherein the server receives a client ready message indicating that the client is prepared to accept the substantive message.

15. A system as claimed in claim 12 wherein transmissions between the client and the server occur using HTTP protocol.

16. A system as claimed in claim 12 wherein client side transmissions are implemented at least partly in HTML.

17. A system as claimed in claim 12 wherein client side transmissions are implemented at least partly in JAVA.

18. A system as claimed in claim 12 wherein client side transmissions are implemented at least partly as an ActiveX control.

19. A system as claimed in claim 12 wherein the request transmitted from the client includes an identifier that uniquely represents a current client application.

20. A system as claimed in claim 12 wherein the server transmits as substantive messages to at least one client new offers and/or updates to offers in a trading application.

21. A system as claimed in claim 20 wherein the server further transmits between two clients counteroffers and respective replies, such that instant messaging between the two clients is effectively provided.

22. A system as claimed in claim 12 wherein the server further exchanges substantive messages between two clients and thereby provides instant messaging.

23. A computer network communications method comprising the steps of:
   transmitting from a client to a server a request to establish a connection; iteratively
   (a) maintaining the connection in the absence of a substantive message, wherein maintaining the connection includes transmitting a single character indicator pre-established to indicate a non-substantive message from the server to the client at short intervals; and
   (b) transmitting from the server to the client a substantive message upon existence of the substantive message at the server, the single character indicator being outside of and separate from a substantive message, wherein the transmitted single character indicator comprises a single bit.

* * * * *